(12) United States Patent
Stevens et al.

(10) Patent No.: US 7,706,685 B2
(45) Date of Patent: Apr. 27, 2010

(54) DATA COMMUNICATION NETWORK USING OPTICAL POWER AVERAGED MULTIPLEXING

(75) Inventors: Rick C. Stevens, Apple Valley, MN (US); Gregory J. Whaley, Woodbury, MN (US); Brian S. Leininger, Woodbury, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 1254 days.

(21) Appl. No.: 11/230,882

(22) Filed: Sep. 20, 2005

(65) Prior Publication Data

US 2007/0065149 A1 Mar. 22, 2007

(51) Int. Cl.
*H04J 14/00* (2006.01)
(52) U.S. Cl. .............................. 398/45; 398/46; 398/57
(58) Field of Classification Search ............. 398/45–46, 398/57, 70–71, 186
See application file for complete search history.

(56) References Cited

U.S. PATENT DOCUMENTS

| | | | |
|---|---|---|---|
| 4,471,494 A | 9/1984 | Keil et al. | |
| 4,677,608 A | 6/1987 | Forsberg | |
| 4,824,201 A | 4/1989 | Kazovsky | |
| 4,864,649 A | 9/1989 | Tajima et al. | |
| 5,483,370 A | 1/1996 | Takahashi | |
| 5,581,386 A | 12/1996 | Suzuki | |
| 6,650,800 B2 | 11/2003 | Litvin | |
| 6,763,192 B1 | 7/2004 | Jagannathan | |
| 6,782,200 B1 | 8/2004 | Warbrick et al. | |
| 6,782,210 B1 | 8/2004 | Okada et al. | |
| 6,788,839 B2 | 9/2004 | Litvin | |
| 6,788,896 B1 | 9/2004 | Wang et al. | |
| 6,819,878 B1 | 11/2004 | King et al. | |
| 6,839,322 B1 | 1/2005 | Smith | |
| 6,850,662 B1 | 2/2005 | Mills et al. | |
| 6,853,764 B2 | 2/2005 | Heiks et al. | |
| 6,973,229 B1 * | 12/2005 | Tzathas et al. ................. 385/16 |

(Continued)

OTHER PUBLICATIONS

Calabretta, N.; Hill, M.T.; Destura, G.; Liu, Y.; Huijskens, F.; Bruni, J.V.; and Dorren, H.J.S.; *Photonic Packet Switching Using All-Optical Header Processing and Storage of Header Information*; Proc. Symposium IEE/LEOS Benelux Chapter 2000, Delft, The Netherlands; pp. 199-202.

(Continued)

*Primary Examiner*—Dzung D Tran
(74) *Attorney, Agent, or Firm*—Larkin Hoffman Daly & Lindgren Ltd.; Craig J. Lervick (57) ABSTRACT

An optical network system, including multiple nodes, an optical switch, and a switch controller, is configured to achieve communication in the optical domain. Each node is configured to receive both high frequency and low frequency inputs, generally utilized for handling data and addressing information, respectively. The two types of information are combined to create an amplitude modulated optical signal. Subsequently, the two types of information are separated by examining the optical power average of the signal being transmitted. Using one portion of the signal for addressing information, the switch controller can perform necessary routing and arbitration functions. Appropriate communications can then be sent back to the nodes and the optical switch to achieve the necessary configuration. The protocol utilized allows for subsequent arbitration and data transmission cycles, allowing the system and switch controller to configure transmission paths and arbitrate any communication issues. All optical data transmission is then commenced.

19 Claims, 8 Drawing Sheets

U.S. PATENT DOCUMENTS

| | | |
|---|---|---|
| 7,340,169 B2 * | 3/2008 | Ovadia et al. ............... 398/57 |
| 7,426,210 B1 * | 9/2008 | Miles et al. ............... 370/400 |
| 2005/0135807 A1 * | 6/2005 | Fujita et al. ............... 398/45 |

OTHER PUBLICATIONS

Yoo, S.J.B.; Hyuek, Jae Lee; Pan, Zhong; Cao, Jing; Zhang, Yanda; Okamoto, Katsunari, and Kamei, Shin; *Rapidly Switching All-Optical Packet Routing System with Optical—Label Swapping Incorporating Tunable Wavelength Conversion and a Uniform-Loss Cyclic Frequency AWGR*; IEEE Photonics Technology, vol. 14, No. 8, Aug. 2002; pp. 1211-1213.

\* cited by examiner

DATA COMMUNICATION NETWORK USING OPTICAL POWER AVERAGED MULTIPLEXING

BACKGROUND OF THE INVENTION

The present invention relates to optical communication systems. More specifically, the present invention relates to optical networks used for communication between multi-processing systems.

Switching networks are widely used to provide very flexible network communication. Presently used communication methods, known as packet routing, allows for the effective transmission of information over a network from one component to a targeted destination. In these systems, the information is first configured as a packet which typically includes addressing information and data. The addressing information is typically contained in a header, which is then followed by the data (often referred to as the payload). Using this format, switching networks are capable of determining a desired address, and subsequently transmitting the packet from a source to a defined destination.

As is well known, optical communication is widely used in today's society for numerous reasons, including the speed and accuracy achieved using fiber optic cables. Present optical communication networks use both electrical and optical components to achieve switching and routing, which can provide undesirable complications. Specifically, present day switching networks require an optical to electrical transformation, where optical signals are first converted to electrical signals within the switching network. Once in the electrical domain, the signals can then be processed to allow appropriate configuration of switching networks, and transmission to the appropriate locations. The signals are then converted back to the optical domain when transmitted to the desired locations based on the addressing and network protocol being used.

A network which utilizes this optical-electrical-optical conversion has certain disadvantages. First, considerable power is required to achieve the required conversion/transformations. Power consumption is always an issue which is to be considered and minimized.

Further, the above-mentioned conversions also create size issues. Specifically, to accommodate both electrical and optical components and the interfaces there between, requires space to house all of these components. Along with the requirement for additional components, cost and reliability issues are also raised. That is, the increased number of components obviously requires more cost and the greater possibility of failure. Further, the operation constraints of the optical/electrical conversions also create limits on the operating capabilities of the system. Specifically, the components must be configured to accommodate conversions at various rates, thus placing additional operational constraints on the system itself. These limitations also complicate the scalability of the system, as changes to the data rates and/or protocols would require similar changes to all the components.

In response to these disadvantages, it would be desirable to create a communication system that will allow data to be switched between various nodes while remaining in the optical domain. Further, it is desirable to create a communication system wherein routing control (addressing) is implemented independent of the data rate. By separating the two aspects, scalability and reliability are greatly improved.

Prior systems have attempted to switch data in the optical domain, however, have not necessarily required independence between data rate and addressing. In one scheme, a system has been devised which utilizes packet type communication with the packet including a header and payload. In this instance, the header is removed from the payload and processed to achieve appropriate switching. Upon receipt, a new header is re-associated with the payload to form a new packet more compatible with the switch involved. While optical switching is attained, the addressing/arbitration is not necessarily performed independent of the payload. As such, several limitations continue to exist. For example, considerable buffering is required for the payload while arbitration functions are dealt with.

In an attempt to address some of the speed and power problems addressed above, one solution presented has involved the use of headers encoded at a much lower frequency than the payload. Thus, lower frequency detectors can be utilized to read and interpret the header information and provide appropriate arbitration. This solution, however, requires the separation of the header and payload, and considerable buffering to insure operation.

BRIEF SUMMARY OF THE INVENTION

In light of the above referenced complications and difficulties with existing packet switching networks and packet based communication systems, the present invention provides a communication protocol and system which allows for the fast and efficient communication of information between multi-processing systems.

In an effort to address the shortcomings discussed above, the system of the present invention is configured to allow the transfer of data using all optical components, thus minimizing the complications related to optical-electrical-optical transformations. Further, communication tasks are distributed between various components and do not rely upon the switching network to achieve every function. The coordination of the various components provides efficient communication functionality while also operating at a lower power and reduced size (i.e., fewer components are required).

The protocol for communication within the system utilizes two separate but very related cycles to achieve its functionality. Initially, an arbitration cycle is utilized to determine and set up communication paths within a switching network. The communication required to achieve this arbitration cycle is primarily related to addressing, and can typically occur at lower frequencies. Control signals for the arbitration cycle are power amplitude modulated upon the optical signal being communicated, thus increasing the efficiency of the system. Next, a subsequent data cycle is used to transmit the data via the communication path that was configured during the previous arbitration cycle. As an advantage to the invention, however, the arbitration cycles for a subsequent transmission can run concurrently with the data transmission cycle. Again, the arbitration information is power amplitude modulated, thus can easily be separated from data transmission signals being communicated.

In order to achieve this communication functionality, the communication system is made up of three primary types of components, including nodes, a switch, and a controller. Each node is configured to transmit and receive the optical signals being communicated. As will be described further, power amplitude modulation is utilized to encode arbitration information on these optical signals. This methodology allows for a lower frequency arbitration signal to be utilized in combination with higher frequency data signals. In addition, each of the nodes is provided with buffering capabilities to allow appropriate coordination with all other components of the network. The nodes may take different forms, including computers, peripheral devices, etc.

A simplified optical switching network is utilized to provide the desired routing for packet transmission. Again, the switching network is configured to allow the transmission of data in an all optical format and is independent of the data format being received and/or transmitted. This feature obviously allows ease of scalability and coordination with other systems.

Lastly, in communication with the switching network is a controller which provides the arbitration and security functions for the network. The controller is in direct control of the switch and its appropriate transmission functions. As generally outlined above, the controller switch will obtain the low frequency addressing information from various packets within the network, and configure the switching network appropriately to achieve the desired routing. The controller itself is capable of planning multiple data cycles, thus staying ahead of the process. Additionally, the controller will implement network security, and other network oversight functions As mentioned above, the arbitration cycle is achieved utilizing optical power averaged multiplexing. Specifically, each node will include a high speed variable optical attenuator to achieve the desired modulation. The necessary arbitration cycle information is decoded by the switch controller and utilized to configure the switching network appropriately. By configuring the system in this manner, all arbitration and switching functions are independent of the optical switch itself, which provides advantages in speed, size, power consumption, and flexibility.

BRIEF DESCRIPTION OF THE DRAWINGS

Further objects and advantages of the present invention can be seen by reviewing the following detailed description in conjunction with the drawings in which.

DETAILED DESCRIPTION OF THE INVENTION

Figure 1:
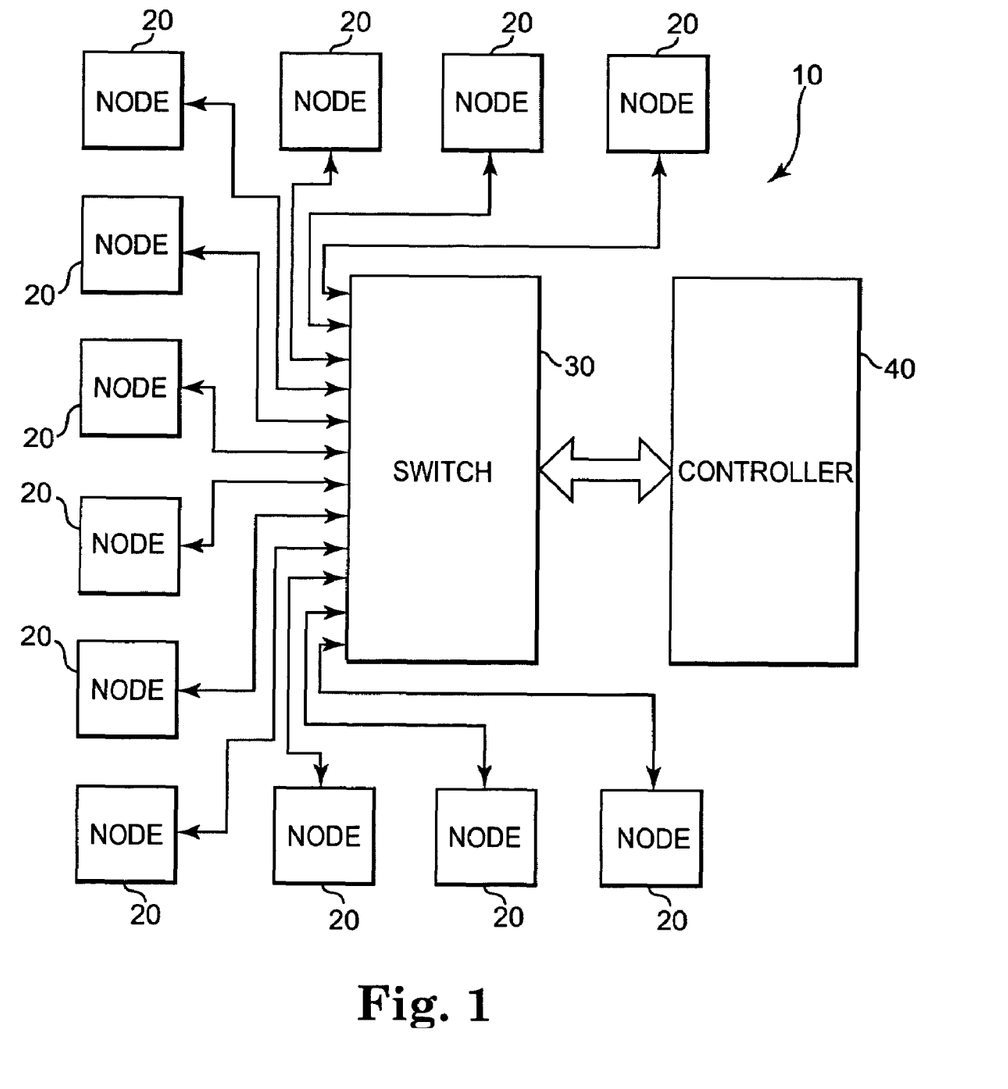
FIG. 1 is a block diagram illustrating the communication system of the present invention.

As can been seen in FIG. 1, one embodiment of the present invention includes a data communication system 10 which includes a plurality of nodes 20, each of which are connected to an optical switch 30. Additionally, the communication system 10 also includes a controller 40 which is connected to switch 30. It is understood that all of the above connections or attachments, as shown in FIG. 1, indicate a transmission path between these various components. While FIG. 1 illustrates one potential layout, the system is not restricted to the specific physical configuration shown.

As will be further outlined below, each node 20 is configured to transmit and receive data. Nodes 20 may take on many different forms, including a part of separate processing systems, and/or remote components of different types. For example, some of the nodes could be memory resources accessed by other nodes that are processors. In general, the nodes could be either a homogenous or heterogeneous collection of processors, memories, and/or input/output resources.

Generally speaking, the present invention is capable of packet or circuit switched communication using a unique protocol and system configuration which accommodates efficient transmission and receipt of information. Further, the system is easily scalable without any significant changes. To achieve efficient communication, a network is provided which does not require optical to electrical conversions to transmit data, thus increasing efficiency and lowering power consumption. Stated alternatively, using the system and protocol of the present invention, data remains in the optical domain when transmitted from node to node.

Figure 2:
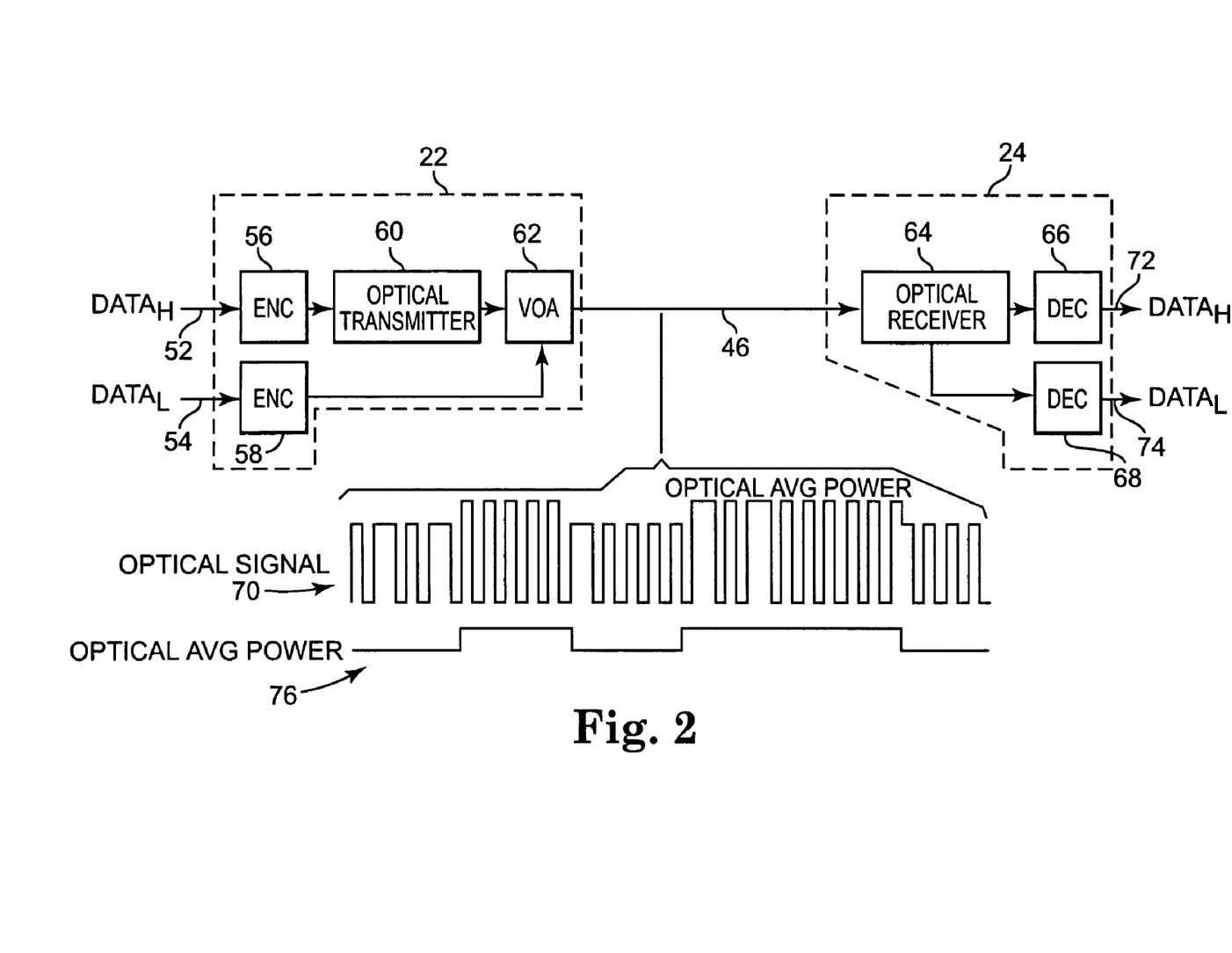
FIG. 2 is a graphical illustration outlining the transmission techniques of the present invention.

Referring now to FIG. 2, there is shown a combination schematic/graphical illustration regarding the actual communication techniques utilized by the present invention. As can be seen, a pair of inputs is provided to a transmission portion 22 of node 20, including a high frequency input 52 and a low frequency input 54. As discussed further below, high frequency input 52 will receive the data or payload in this communication scheme, whereas low frequency input 54 provides arbitration information, so the payload can be appropriately routed. These inputs are provided to a high frequency encoder 56 and a low frequency encoder 58, respectively. High frequency encoder 56 has an output coupled to an optical transmitter 60, whose output is then provided to a variable optical attenuator (VOA) 62. The output of low frequency encoder 58 is attached to VOA 62 at an attenuation control input. Using these connections, the high frequency optical signal provided by optical transmitter 60 thus has its amplitude modulated according to the output from low frequency encoder 58. An example of the output optical signal from VOA 62 is shown in FIG. 2. More specifically, example signal 70 is shown as a pulsed signal with variable amplitudes.

The signal from VOA 62 is transmitted across an optical fiber 46 (or series of optical connections) to a receiving portion 24 of a desired node for decoding. As can be seen, receiving portion 24 includes an optical receiver 64 configured to receive the signal and provide outputs to a high frequency decoder 66 and a low frequency decoder 68. High frequency decoder 66 is configured and designed to differentiate the high frequency signal being provided, and pass this information to subsequent devices. Low frequency decoder 68, however, is designed and configured to determine the average optical power from the signal received and provide an output signal indicative of that power level. As the power level was modulated based upon the signal at low frequency data input 54, the data recovered at low frequency data output 74 is identical to this modulation control signal (i.e., the lower frequency data input 54). As an illustration of this optical average power, the corresponding power signal 76 is illustrated, and coincides with example signal 70. Naturally, the above example illustrates only the transmission and receipt characteristics of various components, and how the optical power averaged multiplexing concept works. In operation, the system is capable of switching and arbitration functions, thus requiring communication with switch controller 40, which is further discussed below.

As is generally shown from the system and communication methodology outlined in FIG. 2, the communication system of the present invention provides the ability to communicate multiple types of information over a single fiber optic communication line. This ability to combine two different data sources provides great flexibility and functionality for fiber optic communication systems.

As understood, packet routing systems must deal with both addressing information and data. Addressing information has traditionally been placed in a packet header, and was decoded by appropriate components within the system to determine routing and arbitration functions. The actual data, referred to as a payload, then makes up the remainder of the packet. The present invention deals with these two types of information easily and efficiently by using the low frequency components for addressing and arbitration functions, and using the high frequency components for data. One significant result of this treatment is the ability to keep data in the optical domain, thus not requiring an optical-electrical-optical conversion process for its transmission.

As mentioned above, communication system 10 includes a plurality of nodes 20, each configured to transmit and receive information. Each node contains all necessary components to achieve the above-referenced communication methodology as mentioned in reference to FIG. 2. As further outlined below, attaching a plurality of nodes 20 to optical switch 30, allows the network communication goals of the present invention to be achieved.

Figure 3:
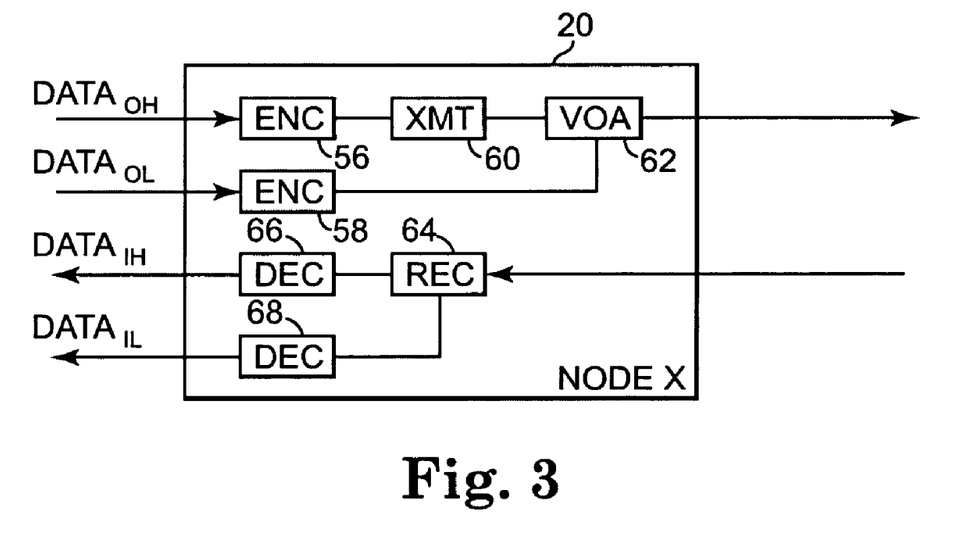
FIG. 3 is a detailed schematic of a node as utilized in the system of the present invention.

Referring now to FIG. 3, there is shown a block diagram of an individual node. For ease in understanding, like numbers have been used to identify those components discussed above. Node 20 includes all components necessary to transmit and receive data on a network. Specifically, node 20 has its output section which includes high frequency encoder 56, low frequency encoder 58, optical transmitter 60 and variable optical attenuator 62. Further, to enable the receipt of data and addressing information, an input section of node 20 includes an optical receiver 64, a high frequency decoder 66 and a low frequency decoder 68. Using the principles further outlined below, node 20 is capable of communicating with similarly situated nodes in the communication system 10.

Figure 4:
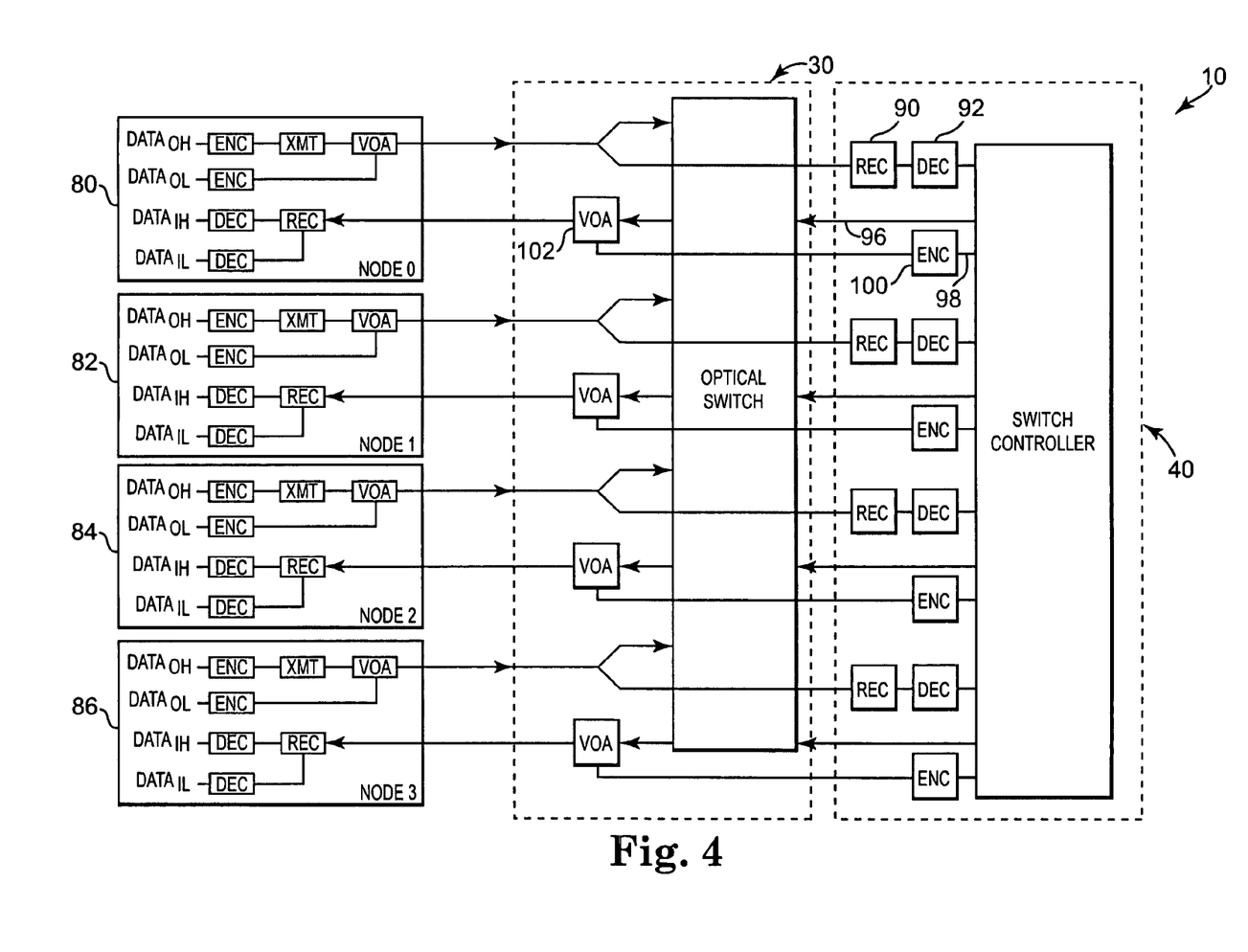
FIG. 4 is another schematic diagram of a communication system utilizing the concepts of the present invention.

Referring now to FIG. 4, there is shown a more detailed block diagram illustrating one embodiment of a communication system utilizing the principles of the present invention. Specifically shown in FIG. 4, is a first node 80 (node 0), a second node 82 (node 1), a third node 84 (node 2), and a fourth node 86 (node 3), all in communication with optical switch 30. As will be further discussed below, optical switch 30 provides the necessary routing or connections between the various nodes in order to accommodate the desired transfer of data.

Communication system 10 has connections between optical switch 30 and switch controller 40 to provide appropriate functionality between these components. Switch controller 40 handles all addressing and arbitration functions for the present system. Thus, switch controller 40 generally receives address information from the nodes, and provides signals to optical switch 30 to achieve appropriate configuration for the desired communication. To achieve this, switch controller 40 also cooperates with a plurality of receivers, decoders, and encoders to provide the desired functionality. Naturally, these components (receivers, decoders, and encoders) may be separate, or within switch controller 40 itself. By way of example, a first receiver 90 is connected to receive output signals transmitted from first node 80 and provide an output to first decoder 92. Switch controller 40 then receives a signal from first decoder 92. Again, the signals being provided to switch controller 40 all relate to arbitration functions for the communication system. Thus, in this particular embodiment, the signals provided to switch controller 40 are lower frequency signals derived from the above-mentioned amplitude modulated signal. It will be understood that each node has similar connections to controller 40.

Switch controller 40 also has a switch control output 96 provided to optical switch 30, and an arbitration output 98 that is provided to a first encoder 100. Switch control output 96 is attached to optical switch 30 in order to achieve the appropriate configuration for subsequent communication. Arbitration output 98 provides arbitration information back to first node 80 so that communication for the entire system can be managed. In order to utilize the fiber network in place, first encoder 100 has its output attached to a first VOA 102 to again provide an amplitude-modulated signal back to first node 80.

Figure 5A:
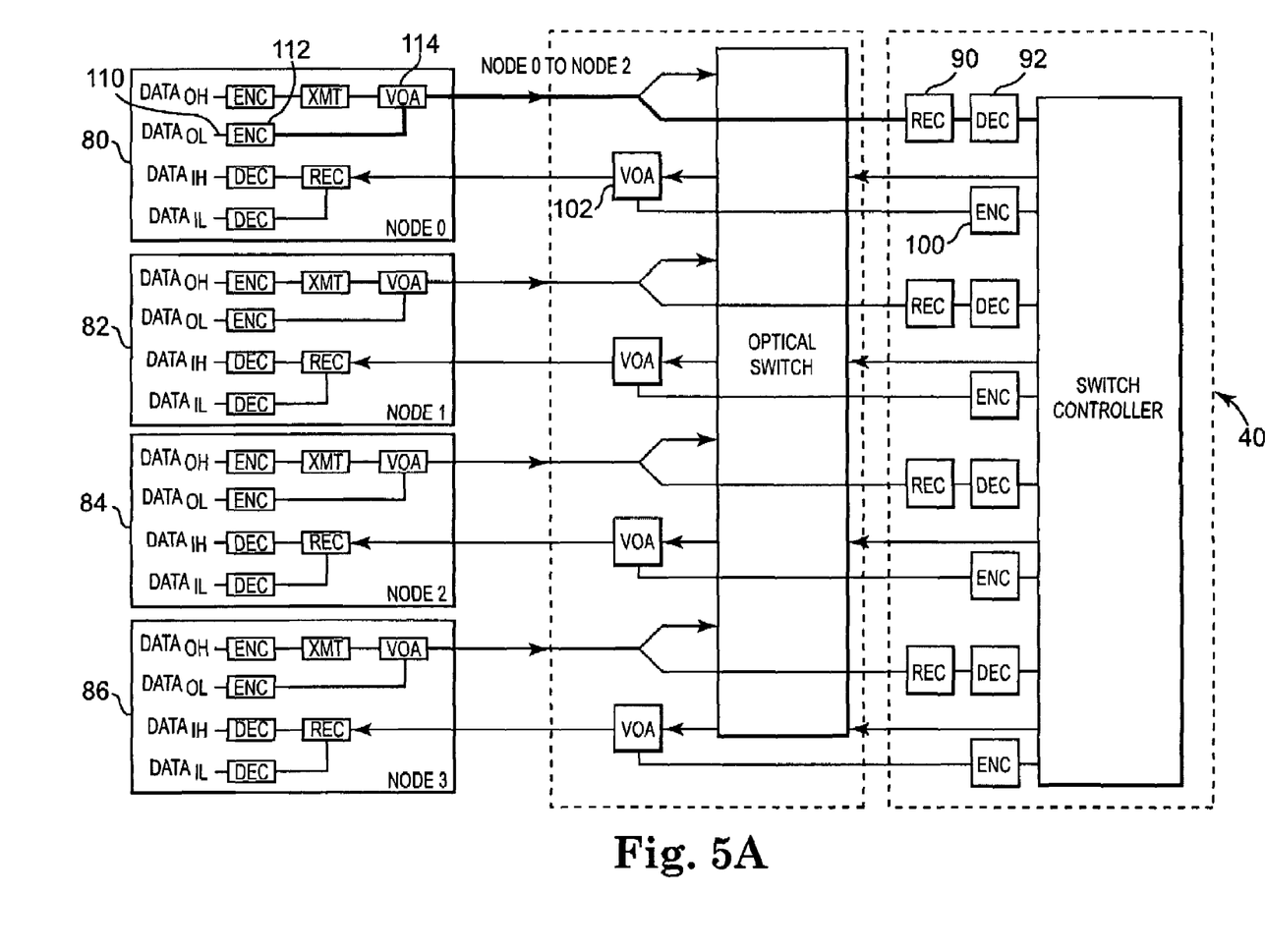
FIG. 5 is a block diagram illustrating the various steps for communicating information, including a request step, grant step, and data transmission.

In order to explain the communication techniques of communication system 10, FIG. 5 illustrates an example progression of communication taking place between various nodes within the system. In this example, node 0 80 is transmitting information to node 2 84. In the protocol used by the illustrated embodiment, communication is initiated by a node requesting transmission to another node. In this particular case (shown in FIG. 5A), node 0 80 is making a request to transmit information to node 2 84. As is illustrated by the bolded communication line, the request will come in the form of a signal on $Data_{OL}$ line 110. This signal is then sent through low frequency encoder 112 and VOA 114. Once output from VOA 114 the signal is communicated to receiver 90 and decoder 92 so that it may be passed on to switch controller 40. Switch controller 40 contains the logic and necessary programming to receive this request and take appropriate action. Based upon the arbitration criteria programmed into switch controller 40, it will first determine whether a grant of this request is appropriate. When the necessary criteria are met for granting the request, this will be communicated back to the appropriate nodes. Generally, the criteria used by switch controller 40 will be related to security, traffic management, and overall system control factors.

Figure 5B:
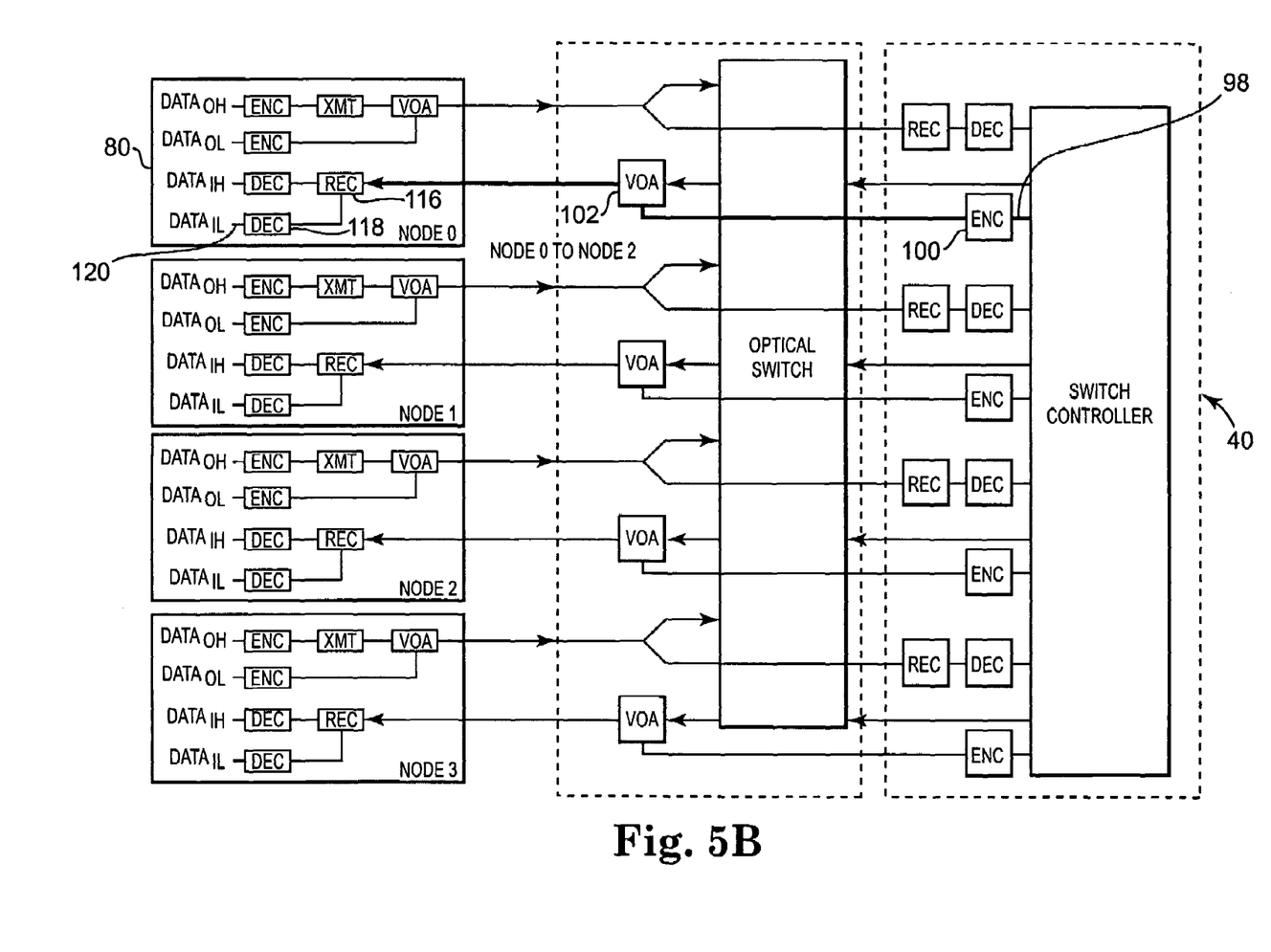

Assuming it is appropriate to grant the request made, further steps must be taken to achieve appropriate system configuration. Referring now to FIG. 5B, the communication path implementing this grant is illustrated, wherein switch controller 40 outputs an appropriate signal. Encoder 100 receives this signal 98 from controller 40, and cooperates with VOA 102 to communicate a grant signal to node 0 80. Within node 0, the grant signal is received by receiver 116 and transmitted to low frequency decoder 118 and received in the form of signal on $Data_{IL}$ line 120. Based upon this grant, node 0 now has appropriate approval to transmit the data (payload) related to this request.

Figure 5C:
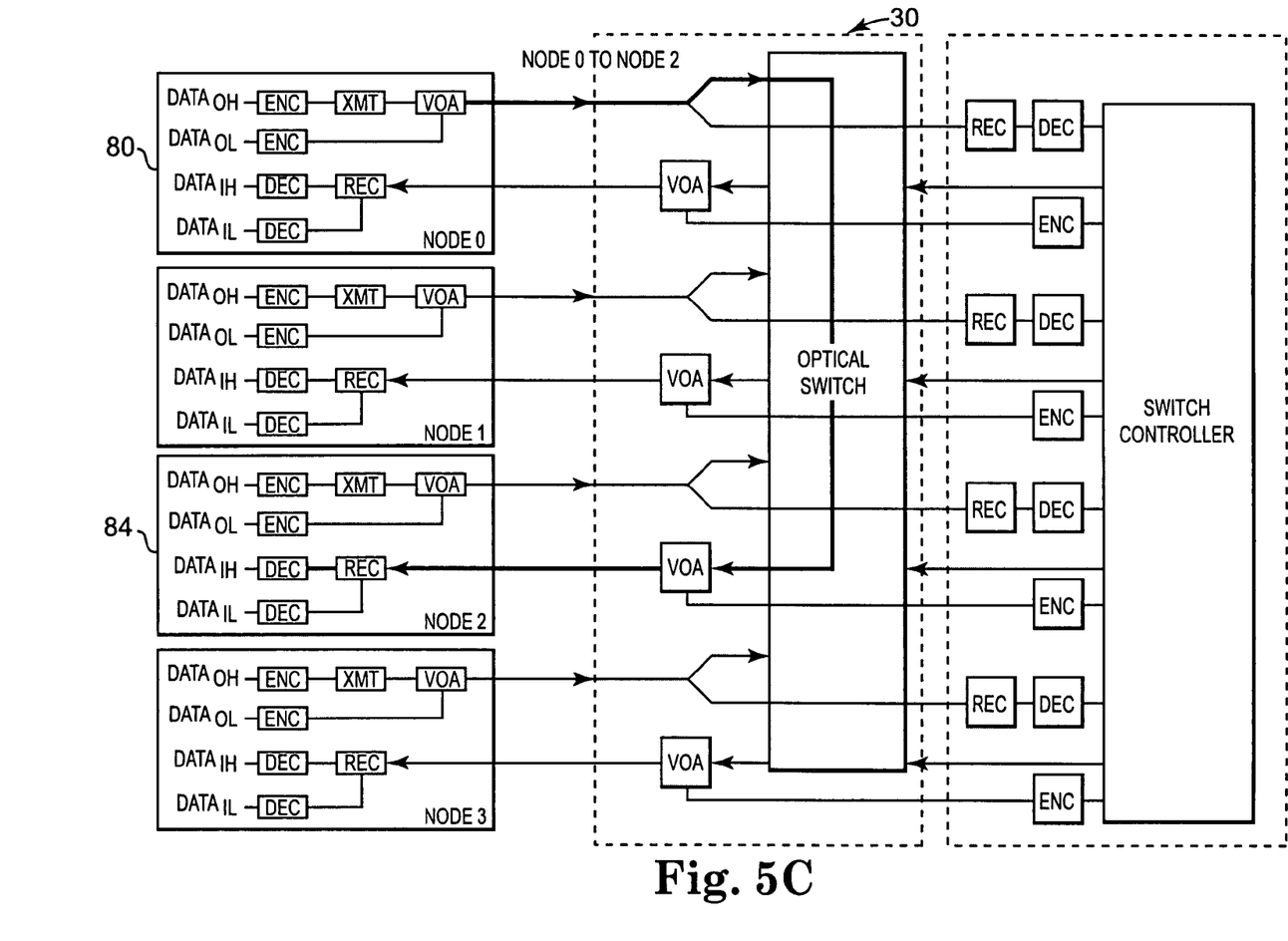

Referring now FIG. 5C, the data transmission from node 0 80 to node 2 84 is again illustrated by bold lines. It is noteworthy that while passing through optical switch 30, the data transmission remains in the optical domain, thus avoiding any complications related to conversions. Based on current technology, the switch controller will likely operate in the electrical domain, thus requiring the necessary conversions. All optical control may be a possibility depending on the development of future controllers.

Figure 6:
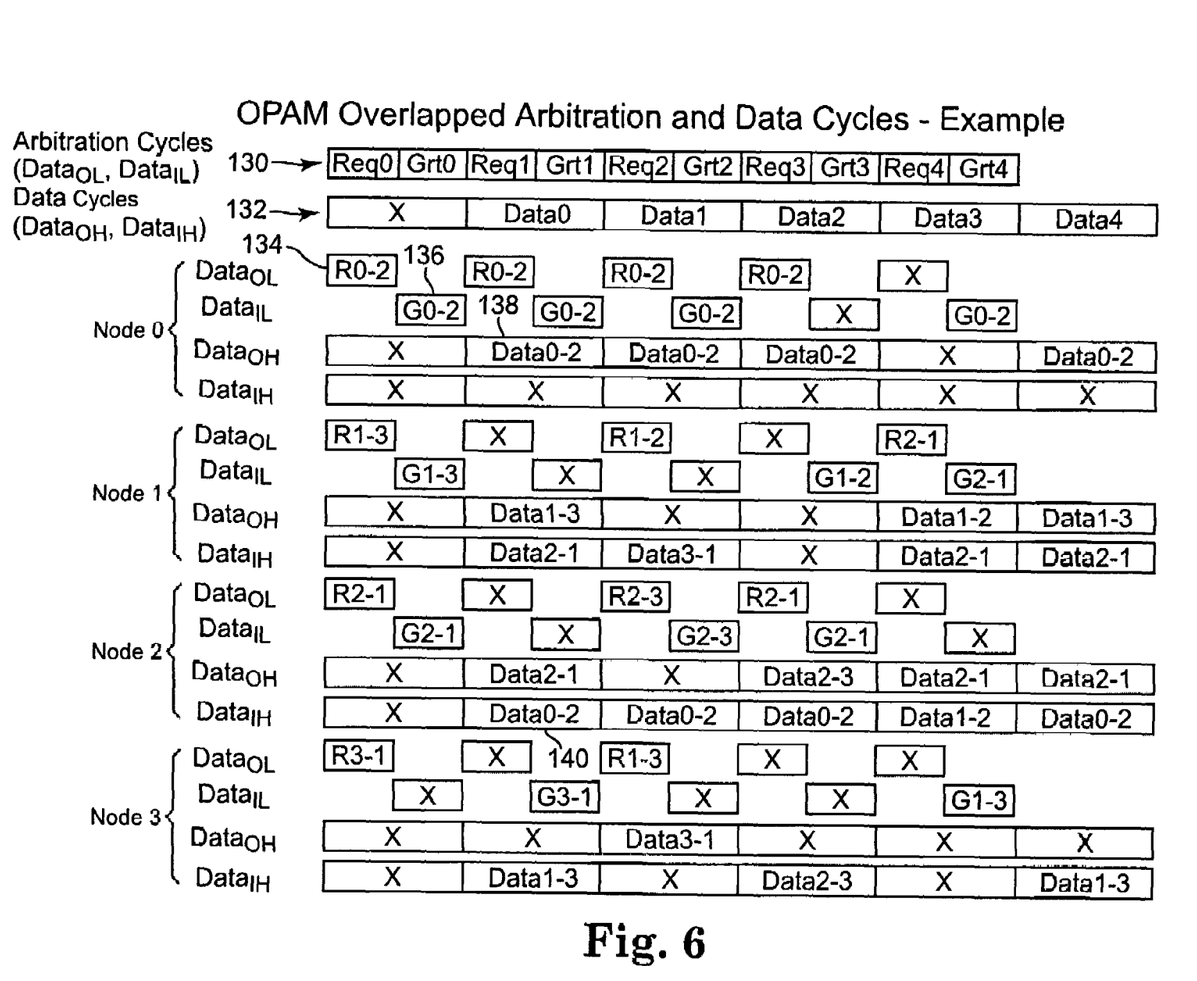
FIG. 6 is a timing diagram illustrating one example of the arbitration and data transmission cycles of the present invention.

As will easily be appreciated, the communication methodology outlined above, allows for multiple nodes within the system to communicate with one another under the control of switch controller 40. Given the ability to transmit both high frequency and low frequency over the optical connections of the network, and utilizing the above-referenced protocol for packet communication, the network is thus capable of coordinating communication between these multiple nodes in an overlapped fashion. One example of this overlapped transmission technique is illustrated in FIG. 6 which is a timing diagram illustrating exemplary communication within the network. As can be seen from FIG. 6, the system allows for the overlapping of arbitration cycles 130 and data cycles 132. With reference to FIG. 5, the request, grant and data transmission cycles illustrated in those figures can also be seen in FIG. 6. More specifically, the request from node 0 to node 2 is shown as block 134, and the corresponding grant is shown in block 136. In the next data cycle, the transmission of data from node 0 80 to node 2 84 is illustrated in block 138, and the corresponding receipt of data is illustrated in block 140.

Also illustrated in FIG. 6 are various requests and arbitration functions that are carried out by switch controller 40. For example, in arbitration cycle REQ0, node 3 requests a transmission of information to node 1. Due to network availability, the grant is not received until arbitration cycle GRT1. Subsequently, during data cycle data 1, the data is transmitted. Various other examples of this overlapped communication technique is also illustrated in the example of FIG. 6.

As generally discussed above, the use of optical power amplitude modulation provides the ability to communicate information between nodes in an improved manner. One significant difference, which is obvious from the communication protocol discussed above, is the elimination of a predefined packet format which previously had always included a header and payload. Additionally, the actual communication of data is maintained in the all-optical domain, thus eliminating issues with power consumption and unreliability.

The above embodiments of the present invention have been described in considerable detail in order to illustrate their features and operation. It is clearly understood however, that various modifications can be made without departing from the scope and spirit of the present invention.

What is claimed is:

1. An optical communication system providing communication of information, comprising:
    a plurality of communication nodes, each node configured to transmit and receive optical signals containing addressing information and data, wherein the nodes include an optical attenuator to allow for amplitude modulation of an output signal thereby allowing for addressing information to be amplitude modulated on the optical signals while the data is carried by a second modulation scheme, thus creating the optical signals which contain both the addressing information and data, the nodes further including a decoder to decode both addressing information and data when received;
    an optical switch connected to the plurality of communication nodes and capable of receiving the data from the plurality of nodes and directing the data back to the plurality of nodes in a desired manner, the optical switch being configurable to achieve the desired direction of data based upon at least one received control signal; and
    a switch controller operably connected to the optical switch and the plurality of nodes, wherein the switch controller receives the optical signal and decodes the amplitude modulated addressing information, thereafter producing the at least one control signal which is transmitted to the optical switch causing the switch to be appropriately configured to allow the desired directing of data, and the switch controller for further producing arbitration control signals which are transmitted back to the nodes to control communication within the system.

2. The optical communication system of claim 1 wherein the addressing information and the data are transmitted at differing frequencies.

3. The optical communication system of claim 2 wherein the addressing information is transmitted at a relatively low frequency while the data is transmitted at a relatively high frequency.

4. The optical communication system of claim 1 wherein a predetermined protocol is utilized to facilitate communication, the predetermined protocol including an arbitration cycle and a transmission cycle with the arbitration cycle allowing the switch controller the opportunity to appropriately configure the optical switch for the desired direction of data.

5. The optical communication system of claim 4 wherein the transmission cycle includes the transmission of data to the optical switch and the appropriate redirection of data.

6. The optical communication system of claim 5 wherein the arbitration cycle precedes the transmission cycle for a single transmission.

7. The optical communication system of claim 1 wherein the nodes are configured to receive the arbitration control signals and produce a subsequent optical signal containing data to be directed back to the plurality of nodes in the desired manner based upon the established switch configuration.

8. A method of communicating information across a network from a first node to a second node, wherein the network utilizes an optical switch and a switch controller, the method comprising:
    the first node generating an optical signal including arbitration information indicating the desire to transmit information to the second node, wherein the arbitration information is carried as an optical power modulated portion of the optical signal and the arbitration information is received by the switch controller;
    the switch controller decoding the optical signal to determine the arbitration information and comparing the arbitration information with a predetermined set of arbitration criteria, and when the predetermined arbitration criteria are met producing an arbitration approval signal communicated back to the first node, and producing a switch control signal which is communicated to the optical switch;
    the optical switch being configured to support the transmission of the information from the first node to the second node; and
    transmitting the information from the first node to the second node via the optical switch by the first node producing a subsequent amplitude modulated optical signal containing the information, with the information carried as part of the optical signal which is modulated using a second modulation technique.

9. The method of claim 8 wherein the arbitration information for a single transmission is communicated during an arbitration cycle and the information for the single transmission is communicated during a data cycle, with the arbitration cycle proceeding the data cycle.

10. The method of claim 9 wherein the first node is capable of concurrently transmitting information during the data cycle for the single transmission while transmitting arbitration information for a subsequent transmission, where the subsequent arbitration information is carried as part of the amplitude modulated portion of the optical signal.

11. An optical communication system for managing the communication of information between a plurality of nodes, wherein the information is presented to the system as a communication packet having address information and data, the communication system comprising:
a controller capable of receiving the address information which is transmitted from the nodes as an amplitude modulated portion of an amplitude modulated optical signal, the controller decoding and arbitrating the address information, wherein the arbitration involves determining the desired address and considering additional arbitration concerns, the controller further capable of producing control signals indicative of the desired system configuration and approval to transmit data, wherein the approval to transmit data is communicated to the nodes; and
an optical switch capable of receiving signals from the controller and the plurality of nodes, the optical switch configurable to achieve the desired communication paths system configuration based upon receipt of the control signals produced by the controller, wherein the desired communication paths allows for all-optical communication between a desired subset of the plurality of nodes in response to approval from the controller.

12. The system of claim 11 wherein the addressing information and related data are transmitted from the plurality of nodes in subsequent cycles.

13. The system of claim 11 wherein the additional arbitration concerns include any one selected from the group of security concerns, network traffic concerns and system interrupt concerns.

14. A method of for packet communication across a network, comprising:
obtaining a communication packet which includes addressing information and data information;
producing an optical signal containing the addressing information, wherein the addressing information is an amplitude modulated portion of the optical signal;
examining the optical signal to obtain the addressing information and providing an appropriate network configurations to achieve desired addressing and producing approval signals to cause communication of the data; and
producing a second optical signal which communicates the data information to the desired location via the appropriate network configurations wherein the second optical signal includes a second amplitude modulated portion which comprises addressing information for a subsequent optical signal.

15. The method of claim 14 wherein the data information is communicated in an all optical format.

16. The method of claim 14 wherein the data information and addressing information are produced at differing frequencies.

17. A system for optical communication, comprising:
a plurality of nodes, each including a high frequency encoder, a low frequency encoder, an optical transmitter, a variable optical attenuator, an optical receiver, a low frequency decoder and a high frequency decoder, wherein the high frequency encoder and the optical transmitter produce an optical signal corresponding to a high frequency data signal, the optical signal and an output from the low frequency encoder being provided to the variable optical attenuator so as to produce an output from the variable optical attenuator which is an amplitude modulated optical signal with the amplitude modulation corresponding to a low frequency input provided to the low frequency encoder, the receiver capable of receiving an optical signal and providing it to the high frequency decoder and the low frequency decoder, wherein the low frequency decoder is capable of determining any amplitude modulation upon the signal from the receiver;
an optical switch attached to the plurality of nodes; and
a controller attached to the optical switch and operably attached to the plurality of nodes, wherein the controller includes an optical receiver and a decoder capable of determining any amplitude modulation provided on the modulated optical signal, and subsequently producing a switch control signal and a communication control signal, wherein the communication control signal is transmitted back to the receiver within the plurality of nodes using a controller encoder and a switch variable optical attenuator such that a second amplitude modulated signal is produced indicative of the communication control signal, and the switch control signal is transmitted back to the optical switch, wherein the communication control signal will enable communication by at least one of the plurality of nodes, and wherein the switch control signal will enable appropriate configuration of the optical switch to enable communication of signals between the plurality of nodes.

18. A system for optical communication, comprising:
a plurality of nodes, each including a high frequency encoder, a low frequency encoder, an optical transmitter, a variable optical attenuator, an optical receiver, a low frequency decoder and a high frequency decoder, wherein the high frequency encoder and the optical transmitter produce an optical signal corresponding to a high frequency data signal, the optical signal and an output from the low frequency encoder being provided to the variable optical attenuator so as to produce an output from the variable optical attenuator which is an amplitude modulated optical signal with the amplitude modulation corresponding to a low frequency input provided to the low frequency encoder, the receiver capable of receiving an optical signal and providing it to the high frequency decoder and the low frequency decoder, wherein the low frequency decoder is capable of determining any amplitude modulation upon the signal from the receiver;
an optical switch attached to the plurality of nodes; and
a controller attached to the optical switch and operably attached to the plurality of nodes, wherein the controller includes an optical receiver and a decoder capable of determining any amplitude modulation provided on the modulated optical signal, and subsequently producing a switch control signal and a communication control signal, wherein the communication control signal is transmitted back to the receiver within the plurality of nodes using a controller encoder and a switch variable optical attenuator such that a second amplitude modulated signal is produced which is indicative of the communication control signal, and the switch control signal is transmitted back to the optical switch, wherein the switch control signal will enable appropriate configuration of the optical switch to enable communication of signals between the plurality of nodes wherein a first node of the plurality of nodes will receive a communication request signal at the low frequency input and produce an appropriate optical modulated signal which is transmitted to the controller, and wherein the controller will produce a communication control signal which is transmitted back to the first node granting approval to transmit data signal and will produce a switch control signal to appropriately configure the optical switch based upon the request from the first node, and wherein the first node will produce a second amplitude modulated signal which is transmitted directly to a second node of the plurality of nodes, wherein the second amplitude modulated signal will be received by the high frequency decoder of the second node.

19. The system of claim 18 wherein the controller will produce the grant signal only when a predetermined transmission criteria is met.

* * * * *